Sept. 5, 1967            R. W. RIFFIE            3,339,411
ELECTRODE PROBE ASSEMBLY
Filed June 23, 1965
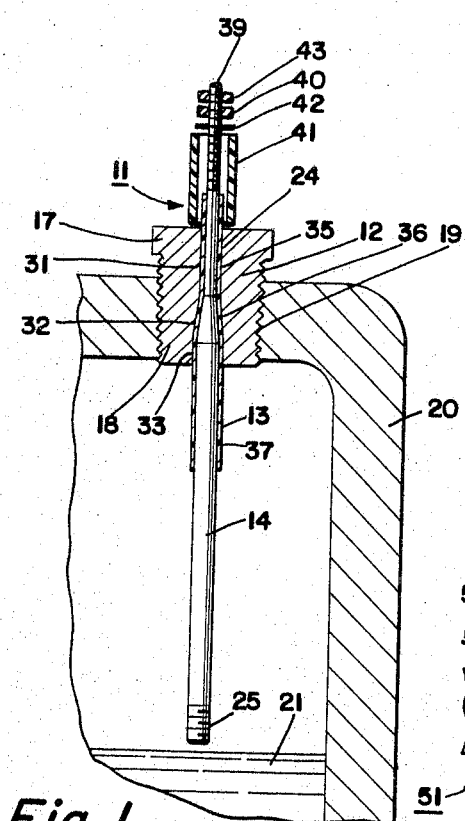
Fig. 1
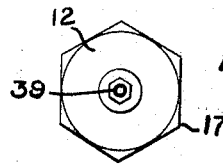
Fig. 2
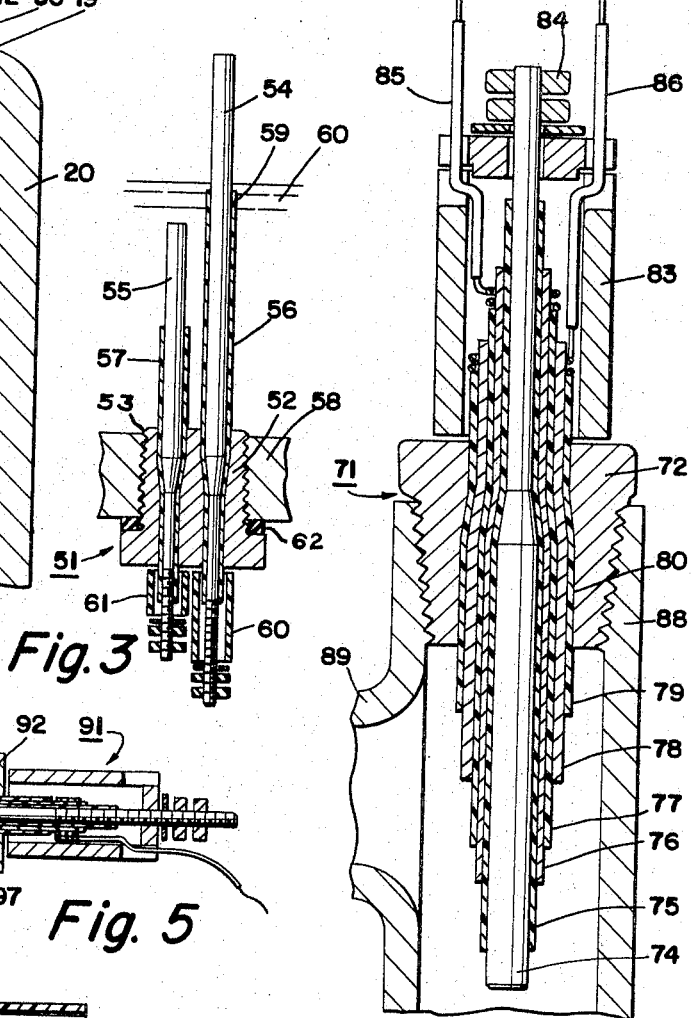
Fig. 3
Fig. 4
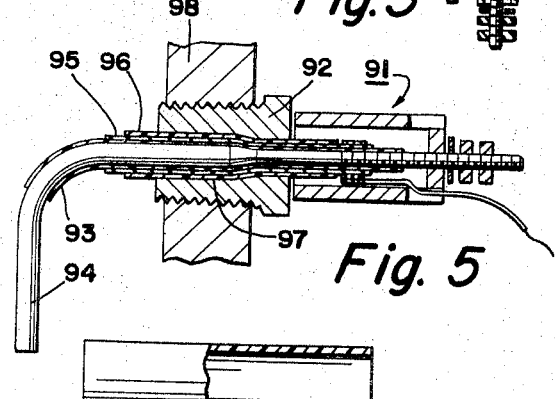
Fig. 5
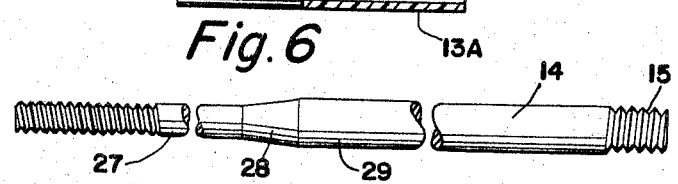
Fig. 6
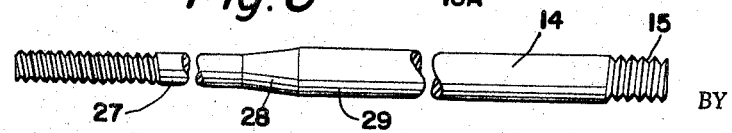
Fig. 7
INVENTOR.
Robert W. Riffie
BY Louis Granger, atty

United States Patent Office 3,339,411
Patented Sept. 5, 1967

3,339,411
ELECTRODE PROBE ASSEMBLY
Robert W. Riffle, Cleveland, Ohio, assignor to
Bedford Controls, Inc., Bedford, Ohio
Filed June 23, 1965, Ser. No. 466,221
14 Claims. (Cl. 73—304)

The invention relates in general to electrode probe assemblies and, more particularly, to a probe assembly of small compact size which may withstand high pressures. Electrode probe assemblies have heretofore been constructed with a metal body and a longitudinal probe insulated from this body. Where the probe assembly is to be used in a high pressure application, such as determining the level of a liquid in a vessel containing a liquid under pressure, the probe assembly must withstand the pressure within the vessel. The insulators used to insulate the probe from the body must withstand such pressure. Previously, it has been a practice to machine the insulator from some machinable material or to cast the insulator from something like porcelain. The machined insulators are generally thick-walled in order to be able to be machined and, also, the porcelain insulators are customarily thick-walled in order to be cast. This gives the entire probe assembly a relatively large diameter and, hence, cross sectional area and, accordingly, the internal force on this probe assembly is quite high. This has limited the pressure to which the probe assembly is capable of being used. Further, where multiple probes are used in one body, this has made the probe body of large diameter and, accordingly, still further limited the pressure to which the probe assembly may be used.

Accordingly, an object of the invention is to obviate the above mentioned disadvantages.

Another object of the invention is to provide a probe assembly of small cross sectional area in order to withstand large internal pressures of a vessel with which the probe assembly is used.

Another object of the invention is to provide a probe assembly with extremely thin-walled yet long and flexible insulators.

Another object of the invention is to provide a probe assembly with sufficiently small diameter probe electrodes and sufficiently thin-walled insulators that multiple coaxial electrodes are made possible in an electrode assembly for use in high pressure applications.

Another object of the invention is to provide a probe assembly with an insulator which may be in tight engagement with the inner probe yet which need not be cemented nor bonded thereto.

Another object of the invention is to provide an electrode probe assembly of multiple probes yet with sufficiently long and thin-walled insulators on each probe so that electrical shorting between probes is eliminated.

Another object of the invention is to provide an electrode probe assembly with a flexible insulator on a probe so that the probe may be bent for greater varieties of uses.

Other objects and a fuller understanding of this invention may be had by referring to the following description and claims, taken in conjunction with the accompanying drawings, in which:

FIGURE 1 is a longitudinal sectional view showing a probe assembly embodying the invention;

FIGURE 2 is a top view of the probe assembly of FIGURE 1;

FIGURE 3 is a longitudinal sectional view of a modification of the invention;

FIGURE 4 is a longitudinal sectional view to an enlarged scale of a further modification;

FIGURE 5 is a longitudinal sectional view of a still further modification of the invention;

FIGURE 6 is an enlarged side view partially in longitudinal section of an insulator tube before assembly; and FIGURE 7 is an enlarged side view of a probe rod before assembly.

The invention is directed to an electrode probe assembly 11, one version of which is shown in FIGURES 1 and 2. This probe assembly includes generally a metal body 12, an insulator tube 13 and a probe rod 14. The metal body 12 has an exterior head 17 to accept a tightening tool and this may be a hexagonal head to accept an ordinary wrench. The body 12 also has an inner end, in this case shown as a threaded shank 18. This threaded shank may be threaded into a threaded aperture 19 in a pressure-liquid containing vessel 20. This might be a high pressure steam boiler or any other vessel in which it is desired to determine the level of a liquid 21.

The metal body 12 has a longitudinal aperture therein in this case shown as a coaxial aperture 24. The probe rod 14 is coaxially disposed in this aperture 24 with the insulator tube 13 disposed between the rod 14 and body aperture 24. The inner end of the rod 14 may be threaded as at 25 in order to accept a threaded extension, should this be desired. FIGURE 7, to an enlarged scale, shows the rod 14 prior to assembly. This rod has first, second and third portions 27, 28 and 29 thereon. The first and third portions 27 and 29 are cylindrical and the second portion 28 is a shoulder or tapered portion. In this embodiment of FIGURE 1, it is shown as being a conical taper which smoothly joins with the first and third portions 27 and 29 respectively.

The body aperture 24 also has first, second and third portions 31, 32 and 33, respectively, disposed in that order from the outer end toward the inner end. Also, the insulator tube 13 has first, second and third portions 35, 36 and 37 respectively. The first, second and third portions on the insulator tube 13 are substantially co-extensive with the respective first, second and third portions on the body aperture 24 and the probe rod 14. As best seen in FIGURE 7, the second portion 28 is disposed at a small included angle relative to the axis. This may be about a seven degree angle on each side or a total of a fourteen degree included angle on this cone. This provides a locking taper joint.

FIGURE 6 shows, to an enlarged scale, the insulator tube 13A prior to assembly and with exaggerated wall thickness. This insulator tube may be made from a heat shrinkable cylindrical tube 13A. A suitable material is TFE polytetrafluoroethylene Teflon. A material suitable for lower temperature or lower pressure applications also may be FEP Teflon which is fluorinated ethylpropylene. Another suitable material is polyolefin. The tube 13A, as shown in FIGURE 6, has been mechanically expanded while heated and then cooled while still expanded. In such case, the tube 13A will remain cylindrical and in its expanded condition. In use in the electrode probe assembly 11 this tube 13A is selected to be of an internal diameter sufficient to just slide over the probe, in this case the probe rod 14. It is next heated and permitted to shrink. It shrinks into tight engagement with the probe rod 14 and into tight engagement with all of said first, second and third portions 27, 28 and 29. The tube 13A may be thin-wall, for example, .016 inch wall thickness. When it is shrunk onto the small diameter first portion 27, this wall will be slightly thicker than that on the third portion 29, but this may be taken into account in providing the proper diameter portions 31, 32 and 33 in the body aperture 24.

The outer end 39 of the probe rod 14 may be threaded to accept a nut 40. A standoff tubular insulator, of porcelain or the like, may be received over the outer end 39 of the probe rod and disposed between the exterior head 17 of the body 12 and a washer 42 disposed adjacent the nut 40. A terminal nut 43 may also be provided so that an external terminal may be connected between the nuts 40 and 43 for external connection to the probe assembly 11.

In assembly of the probe assembly 11 a force is applied pushing the rod 14 and insulator tube 13 outwardly of the body aperture 24. This will tightly squeeze the insulator tube 13 between the probe rod 14 and body 12, especially at the tapered surfaces. Because of the small angle, this will be a locking taper. Next the standoff insulator 41 and washer and nut 40 may be assembled and the nut 40 will maintain the insulator tube 13 tightly squeezed effecting a liquid and pressure tight seal. Preferably, the diameter of the rod third portion 29 is only slightly less than the diameter of the aperture first portion 31 to thus establish this insulator tube 13 under a shear stress. The ability of the insulator tube 13 to withstand this shear stress and to withstand extrusion outwardly through the body aperture 24 also aids the liquid and pressure tight seal.

In a practical probe assembly 11, the probe rod may be only 5/32 inch diameter even on the inner end. With the insulator tube 13 being of thin-wall construction, e.g., .016 inch wall, the total diameter of the rod and the insulator together is about 3/16 inch and the cross sectional area is .0276 square inch. Thus, an internal pressure of 1000 p.s.i. will exert a force of only 27.6 pounds against the end of such rod and insulator tube which can easily withstand that small force.

The probe assembly 11 may be used in an ordinary electric circuit wherein a voltage is applied between the probe rod 14 and the vessel wall 20. When the level of the liquid 21 reaches the end of the probe rod 14, the electric circuit will be closed and current will flow through a signal lamp, an alarm, or will actuate some electrical device such as a valve.

FIGURE 3 shows a modification of the invention and shows an electrode probe assembly 51. This probe assembly is a dual probe having a body 52, two probe rods 54 and 55 and two insulator tubes 56 and 57. The body 52 may be different from body 12 of FIGURE 1, by employing a machine threaded shank 53, in which case a gasket 62 is used to seal the pressure within the vessel 58. This metal body may be threaded into the wall of a vessel 58. As shown, the probe assembly 51 is suitable for insertion through the bottom wall of this vessel 58, in which case, the inner end 59 of the insulator tube 56 is that which determines the level of the liquid 60.

Separate standoff insulators 60 and 61 are used on the outer ends of the probe rods 54 and 55, respectively. With respect to the details of construction of each probe in the assembly 51, the details may be the same as that shown for the probe assembly 11. The fact that the probe rods 54 and 55 are of small diameter and the insulator tubes are thin-walled, permits the metal body 52 to be small diameter. This metal body may be a ½ inch pipe plug, for example, and still contain two or even three of these separately insulated probe rods.

FIGURE 4 illustrates, to an enlarged scale, a further modification of the invention as shown in a probe assembly 71. This probe assembly 71 is a triple coaxial probe assembly. It includes a metal body 72 and several coaxial parts. Starting from the inside out, there is a metal probe rod 74, an insulator tube 75, a metal probe tube 76, an insulator tube 77, a metal probe tube 78 and an insulator tube 79. All of these parts are disposed coaxially in a body aperture 80. Each of these parts of the probe assembly includes a conical tapered portion within the body 72 so that internal pressure on the inner end of the probe assembly tightly squeezes the tapered portions of the insulator tubes into a liquid and pressure tight seal. In each case the insulator tubes 75, 77 and 79 are heat shrunk from a heat shrinkable plastic cylindrical tube onto the next smaller adjacent probe rod or probe tube. A standoff insulator 83 may again be used. A terminal nut 84 permits electrical connection to the probe rod 74. Conductors 85 and 86 may be fastened to the metal probe tubes 76 and 78 for external electrical connection. This provides three external connections to the three parts or probe means 74, 76 and 78 for indication of three different levels of liquid. The body 72 is shown as threaded into the end of a relatively thin-walled pipe 88 which may be connected to a pressure vessel 89. The FIGURE 4 is shown to enlarged scale and as a practical embodiment, the metal body 72 may be a one inch pipe plug so that it may be threaded into one end of a one inch pipe. This small a pipe diameter will permit a relatively thin-wall pipe to withstand pressures of even two or three thousand pounds.

FIGURE 5 illustrates a still further probe assembly 91. This is a coaxial bi-probe including a metal body 92, a probe rod 94, an insulator tube 93, a metal probe tube 95, and an insulator tube 96. These rods and tubes are disposed coaxially in a body aperture 97 and the rod, tubes and aperture all have a conical tapered portion to provide the tight seal at these coextensive tapered portions. The probe rod 94, as shown, may be bent at a 90 degree angle. The metal body 92 is shown as being threaded into the side wall of a vessel 98. The fact that the probe rod 94 is bent downwardly permits the body 92 to be turned or the probe rod 94 to be turned to adjust the level at which an indication is desired. Also, the fact that the insulator tube 93 is made from a heat shrinkable and flexible insulating material permits this insulator tube 93 to be installed on a previously bent probe rod 94. Alternatively, the probe rod 94 may be bent after the insulator tube 93 is shrunk thereon.

The probe assemblies 11, 51, 71 and 91 permit the use of exceptionally thin-walled insulators. If one were to start with a solid Teflon rod or tube and attempt to drill the two internal diameters and the conical tapered portion and also to machine the outside surface with the smaller outside diameter at the first portion and the conical second portion, this would be extremely difficult. This would be true even with a very short insulator, just about the length of the metal body. To attempt to use such an insulator made from a solid Teflon rod or tube in the long lengths shown herein, would be practically impossible or extremely expensive. Thus, the use of heat shrinkable tubing eliminates machining of both the inside and outside of the insulator. Additionally, the heat shrinkable tubing permits use of a small diameter electrode, the insulator for which would be extremely difficult to machine.

The FIGURE 3 perhaps best illustrates the use of a long continuous insulator tube 56. This means that even though the probe rod 55 is small diameter and flexible, any turbulence in the liquid or any misalignment of the probe rod off the axis of the aperture will not permit the probe rod 55 to be shorted against the probe rod 54. All it can touch is the insulator tube 56.

If one were to attempt to machine a short insulator from either a tube or rod it would be extremely difficult to bond a long length of insulator tube to this machined insulator. Any cement used for the bond would reduce the maximum temperature at which the probe assembly could be used.

FIGURE 4 illustrates another advantage of the heat shrinkable insulating tubing. The use of long continuous insulation permits the construction of the coaxial multiple level electrode assembly. In such a fitting it is essential that both metal and insulator wall thicknesses be kept small, otherwise the total diameter of the concentric layers will be large and the probe assembly will not withstand high pressures. The coaxial probe assembly of FIGURE 4 may also be installed from the side or the bottom of a vessel. As shown in FIGURE 4, the probe assembly 71 is installed inside a one inch pipe which may have quite thin walls due to its small diameter yet will withstand high pressures. This multiple level probe assembly 71 also is advantageous because it requires only one hole to be drilled in the vessel instead of several holes to accommodate additional probes otherwise required. The probe assembly 71 is a construction which has great rigidity and resistance to flexing due to liquid flow or turbulence. This resistance to flexing is large because of the gradually reducing diameter of the probe assembly as the distance from the metal body increases. The coaxial probe assembly 71 may, of course, have only two probe means as in FIGURE 5 or may have even more probe means than the three shown.

The several metal parts of the probe assembly may be of brass or stainless steel in order to satisfactorily withstand corrosive action of the environment with which the probe assembly is used. The probe tube 95 in FIGURE 5, for example, need be only about .025 wall thickness. This has considerable rigidity because of the cylindrical shape and provides adequate surface area for the electrical conductivity needed in the electrode probe assembly. The external diameter may be no more than about .250 inch on the larger inner end. In the coaxial tri-probe assembly of FIGURE 4, the outside diameter of the large end of the probe tube 78 also need not be more than about .375 inch. This is quite a small probe assembly and the cross sectional area is quite small which will withstand high internal pressures.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrode probe assembly, comprising, in combination, a body having an axis and an inner end and an outer end, a longitudinal aperture in said body; elongated metal probe means disposed coaxially in said aperture; said body aperture and said probe means each having first, second and third portions disposed in that order from said outer end toward said inner end, each of said first portions being smaller than the respective third portions, each of said second portions including an inwardly facing shouldered form and into tight engagement with said probe means and said body aperture at least at said shoulders, said insulator tube means being heat-shrunk into shouldered form an into tight engagement with said probe means from a heat shrinkable plastic tube; and means acting axially between said probe means and said body to hold said insulator tube means squeezed between said probe means and said body to maintain a liquid and pressure tight seal at said shouldered surfaces.

2. An electrode probe assembly, comprising, in combination, a metal body having an axis and an inner end and an outer end, a longitudinal aperture in said body; elongated metal probe rod means and elongated metal probe tube means of larger diameter disposed coaxially in said aperture; each of said body aperture, probe tube means, and rod means having first, second and third portions disposed in that order from said outer end toward said inner end, each of said first portions being smaller than the respective third portions, each of said second portions including an inwardly facing shoulder; an insulator tube disposed between said probe rod means and said probe tube means and a larger sized insulator tube disposed between said probe tube means and said body aperture at least at said shoulders; and each of said insulator tubes being heat-shrunk into shouldered form and into tight engagement with the next adjacent smaller probe tube means or probe rod means from a heat shrinkable plastic tube.

3. An electrode probe assembly, comprising, in combination, a metal body having an axis and an inner end and an outer end, a longitudinal aperture in said body; and at least one elongated metal probe tube means disposed coaxially in said aperture; said body aperture and probe tube means having first, second and third portions disposed in that order from said outer end toward said inner end, said first and third portions being cylindrical with said first portion smaller than the respective third portion, each of said second portions being tapered and smoothly joining to each of the respective first and third portions; each of said first, second and third portions on said probe tube being substantially axially coextensive with the corresponding portions on said body aperture; a tapered thin-wall insulator tube disposed between said probe tube means and said body aperture at least at said second portions, said insulator tube being heat-shrunk into tapered form and into tight engagement with said probe tube means from a heat shrinkable cylindrical plastic tube; a tapered central insulating core inside said probe tube means at least at said tapered second portion of said probe tube means, and pressure on the inner end of said core and probe tube means acting to hold said insulator tube tightly squeezed to maintain a liquid and pressure tight seal at said tapered surfaces.

4. An electrode probe assembly, comprising, in combination, a metal body having an axis and an inner end and an outer end, a longitudinal aperture in said body; elongated metal probe rod means and at least one elongated metal probe tube means of larger diameter disposed coaxially in said aperture; each of said body aperture, probe tube means, and rod means having first, second and third portions disposed in that order from said outer end toward said inner end, each of said first portions being smaller than the respective third portions, each of said second portions being tapered to join to each of the respective first and third portions; each of said first, second and third portions on said probe tube being substantially axially coextensive with the corresponding portions on said body aperture and probe rod; a tapered thin-wall insulator tube disposed between said probe rod means and said probe tube means and a larger sized tapered thin-wall insulator tube disposed between said probe tube means and said body aperture at least at said second portions, each of said insulator tubes being heat-shrunk into tapered form and into tight engagement with the next adjacent smaller probe tube means or probe rod means from a heat shrinkable plastic tube; and pressure on the inner end of said body, tube means and rod means acting to hold said insulator tubes tightly squeezed therebetween to maintain a liquid and pressure tight seal at said tapered surfaces.

5. An electrode probe assembly, comprising, in combination, a metal body having an axis and an inner and an outer end, a longitudinal aperture in said body; an elongated metal probe rod and at least one elongated metal probe tube of larger diameter disposed coaxially in said aperture; said body aperture and probe tube each having a tapered portion substantially axially coextensive and tapering from a larger diameter at said inner end to a smaller diameter at said outer end, one of said probe tube and said probe rod being longer at said inner end than the other of said probe tube and probe rod, a thin-wall insulator tube disposed between said probe tube and said body aperture at least at said tapered portions of said probe tube and body aperture, said insulator tube being heat-shrunk into tapered form and into tight engagement with said probe tube from a heat shrinkable cylindrical plastic tube; means to relatively insulate said probe rod and probe tube, and means acting axially between said probe tube outer end and said body to hold said insulator tube tightly squeezed between said probe tube and said body to maintain a liquid and pressure tight seal at said tapered surfaces.

6. An electrode probe assembly, comprising, in combination, a body having an axis and an inner and an outer end, a longitudinal aperture in said body; an elongated metal probe rod and at least one elongated metal probe tube of larger diameter disposed coaxially in said aperture; said probe tube and probe rod each having a tapered portion substantially axially coextensive and tapering from a larger diameter at said inner end to a smaller diameter at said outer end, said probe rod being longer at said inner end than said probe tube, a thin-wall insulator tube disposed between said probe rod and said probe tube at least at said tapered portions of said rod and probe tube, said insulator tube being heat-shrunk into tapered form and into tight engagement with said probe tube from a heat shrinkable cylindrical plastic tube; and means acting axially between said probe rod outer end and said body to hold said insulator tube tightly squeezed between said probe rod and probe tube to maintain a liquid and pressure tight seal at said tapered surfaces.

7. A liquid-level electrode probe assembly, comprising, in combination, a metal body having an axis and an inner and an outer end, a longitudinal aperture in said body; an elongated metal probe rod and at least one elongated metal probe tube of larger diameter disposed coaxially in said aperture; each of said body aperture, probe tube, and rod having a tapered portion each substantially axially coextensive and tapering from a larger diameter at said inner end to a smaller diameter at said outer end, said probe rod being longer at said inner end than said probe tube, a thin-wall insulator tube disposed between said probe rod and said probe tube and a larger sized thin-wall insulator tube disposed between said probe tube and said body aperture at least at said tapered portions of said rod, probe tube and body aperture, each of said insulator tubes being heat-shrunk into tapered form and into tight engagement with the next adjacent smaller probe tube or probe rod from a heat shrinkable cylindrical plastic tube; and means acting axially between said probe rod outer end and said body to hold said insulator tubes tightly squeezed between said probe rod, probe tube and said body to maintain a liquid and pressure tight seal at said tapered surfaces.

8. A liquid-level electrode probe assembly, comprising, in combination, a metal body having an axis and an inner end and an outer end, a longitudinal aperture in said body; an elongated metal probe rod and at least one elongated metal probe tube of larger diameter disposed coaxially in said aperture; each of said body aperture, probe tube, and rod having first, second and third portions disposed in that order from said outer end toward said inner end, each of said first and third portions being cylindrical with said first portion smaller than the respective third portion, each of said second portion being tapered and smoothly joining to each of the respective first and third portions; each of said first, second and third portions on said probe tube being substantially axially coextensive with the corresponding portions on said body aperture and probe rod, said probe rod third portion being longer than said probe tube third portion, a tapered thin-wall insulator tube disposed between said probe rod and said probe tube and a larger sized tapered thin-wall insulator tube disposed between said probe tube and said body aperture at least at said second portions of said rod, probe tube and body aperture, each of said insulator tubes being heat-shrunk into tapered form and into tight engagement with the next adjacent smaller probe tube or probe rod from a heat shrinkable cylindrical plastic tube; and means acting axially between said probe rod first portion and said body to hold said insulator tubes tightly squeezed between said probe rod, probe tube and said body to maintain a liquid and pressure tight seal at said tapered surfaces.

9. A liquid-level electrode probe assembly, comprising, in combination, a metal body having a threaded shank with an axis and having an exterior head to accept a tightening tool, said shank adapted to be received in a threaded aperture in a pressure-liquid containing vessel to determine the level of liquid therein, a coaxial aperture in said body; an elongated metal probe rod and at least one elongated metal probe tube of larger diameter disposed coaxially in said aperture; different sized thin-wall insulator tubes disposed between said probe rod, tube and body at said aperture; each of said body aperture, probe tube, insulator tube and rod having first, second and third portions disposed in that order from said head end toward said shank end, each of said first and third portions being cylindrical with said first portion smaller than the respective third portion, each of said second portions being tapered and smoothly joining to each of the respective first and third portions; each of said first, second and third portions on said insulator tubes being substantially axially coextensive with the corresponding portions on said body aperture, probe rod and probe tube, said probe rod being longer than said probe tube to expose a cylindrical periphery on the inner end of said probe rod; each of said insulator tubes being heat-shrunk into tight engagement with the next adjacent smaller probe tube or probe rod from a heat shrinkable cylindrical plastic tube; and means acting between said probe rod first portion and said body to hold said insulator tubes tightly squeezed between said probe rod, probe tube and said body to maintain a liquid and pressure tight seal at said tapered surfaces.

10. A liquid-level electrode probe assembly, comprising, in combination, a metal body having a threaded shank with an axis and having an exterior head to accept a tightening tool, said shank adapted to be received in a threaded aperture in a pressure-liquid containing vessel to determine the level of liquid therein, a coaxial aperture in said body; an elongated metal probe rod and at least one elongated metal probe tube of larger diameter disposed coaxially in said aperture; different sized thin-wall insulator tubes disposed between said probe rod, tube and body at said aperture; each of said body aperture, probe tube, insulator tube and rod having first, second and third portions disposed in that order from said head end toward said shank end, each of said first and third portions being cylindrical with said first portion smaller than the respective third portion, each of said second portions being tapered and smoothly joining to each of the respective first and third portions; each of said first, second and third portions on said insulator tubes being substantially axially coextensive with the corresponding portions on said body aperture, probe rod and probe tube, said probe rod being longer than said probe tube, each of said insulator tubes being heat-shrunk into tight engagement with the next adjacent smaller probe tube or probe rod from a heat shrinkable cylindrical plastic tube; a threaded outer end on said probe rod first portion; and a nut threaded on said rod outer end and acting on said body to hold said insulator tubes tightly squeezed between said probe rod, probe tube and said body to maintain a liquid and pressure tight seal at said tapered surfaces with a locking taper joint thereat; the outer diameter of each said rod and probe tube third portion being only slightly less than the inner diameter of the probe tube and body aperture first portion, respectively, to thus establish said insulator tubes under a shear stress and withstanding extrusion of said rod and probe tube through said body under pressure and effecting said liquid and pressure tight seal.

11. A liquid-level electrode probe assembly, comprising, in combination, a metal body having a threaded shank with an axis and having an exterior head to accept a tightening tool, said shank adapted to be received in a threaded aperture in a pressure-liquid containing vessel to determine the level of liquid therein, a coaxial aperture in said body; an elongated metal probe rod and a plurality of elongated metal probe tubes of different diameters disposed coaxially in said aperture; a plurality of different sized thin-wall insulator tubes disposed between said probe rod and each of said probe tubes and said body at said aperture; each of said body aperture, probe tube, insulator tube and rod having first, second and third portions disposed in that order from said head end toward said shank end, each of said first and third portions being cylindrical with said first portion smaller than the respective third portion, each of said second portions being conical at an included angle of about 14 degrees and smoothly joining to each of the respective first and third portions; each of said first, second and third portions on said insulator tubes being substantially axially coextensive with the corresponding portions on said body aperture, probe rod and probe tubes, said probe rod and said plurality of probe tubes being of different lengths on the shank end of said body, said probe rod being longer than any of said probe tubes, said probe tubes becoming progressively shorter as the diameter thereof increases, said insulator tubes covering substantially the entire length of the next adjacent smaller probe rod or tube, an exposed cylindrical periphery on the inner end of said probe rod and on the inner end of said probe tubes, each of said insulator tubes being heat-shrunk into tight engagement with the next adjacent smaller probe tube or probe rod from a heat shrinkable cylindrical plastic tube; a threaded outer end on said probe rod first portion; a stand-off tubular insulator on the head end of said body; and a nut threaded on said rod outer end and acting through said stand-off insulator to said body to hold said insulator tubes tightly squeezed between said probe rod, probe tubes and said body to maintain a liquid and pressure tight seal at said conical surfaces with a locking taper joint thereat; the outer diameter of each said rod and probe tube third portion being only slightly less than the inner diameter of the respective next larger probe tube first portion to thus establish said insulator tubes under a shear stress and withstanding extrusion of said rod and probe tubes through said body under pressure and effecting said liquid and pressure tight seal.

12. A liquid-level electrode probe assembly, comprising, in combination, a metal body having a threaded shank with an axis and having an exterior head to accept a tightening tool, said shank adapted to be received in a threaded aperture in a pressure-liquid containing vessel to determine the level of liquid therein, a longitudinal aperture in said body, an elongated metal probe rod disposed coaxially in said aperture; an insulator tube disposed between said probe rod and said body at said aperture; each of said probe rod and body aperture having first, second and third portions, each of said first and third portions being cylindrical with said first portion smaller than the respective third portion, each of said second portions being conical at a small acute angle and smoothly joining to each of the respective first and third portions; said insulator tube being thin-walled and of substantially uniform wall thickness throughout the length thereof, said insulator tube covering said second portion of said probe rod, said insulator tube being heat-shrunk into tight engagement with said probe rod from a cylindrical tube of TFE polytetrafluoroethylene Teflon; a threaded outer end on said probe rod first portion; and a nut threaded on said rod outer end to act on said body to hold said insulator tube tightly squeezed between said probe rod and said body to maintain a liquid and pressure tight seal at said conical surfaces with a locking taper joint thereat.

13. A liquid-level electrode probe assembly, comprising, in combination, a metal body having an exterior head to accept a tool and having a threaded shank, said shank adapted to be received in a threaded aperture in a pressure-liquid containing vessel to determine the level of liquid therein, a coaxial aperture in said body, an elongated metal probe rod disposed coaxially in said aperture; an insulator tube disposed between said probe rod and said body at said aperture; each of said body aperture, tube and rod having first, second and third portions disposed in that order from said head end toward said shank end, each said first and third portions being cylindrical with said first portion smaller than the respective third portion, each said second portion being conical at an included angle of about 14 degrees and smoothly joining to each of the respective first and third portions; each of said first, second and third portions on said tube being substantially axially coextensive with the corresponding portions on said body aperture and rod, said insulator tube being thin-walled and of substantially uniform wall thickness throughout the length thereof, said insulator tube being heat-shrunk into tight engagement with said probe rod from a cylindrical tube of TFE polytetrafluoroethylene Teflon; a threaded outer end on said probe rod first portion; a stand-off tubular insulator on the head end of said body; the diameter of said rod third portion being only slightly less than the diameter of said aperture first portion, and a nut threaded on said rod outer end to hold said insulator tube tightly squeezed at said conical second portion thereof between said probe rod and said body to maintain a liquid and pressure tight seal at said conical surfaces with a locking taper joint thereat.

14. A liquid-level electrode probe assembly, comprising, in combination, a metal body having an exterior head to accept a tool and having a threaded shank, said shank adapted to be received in a threaded aperture in a pressure-liquid containing vessel to determine the level of liquid therein, a coaxial aperture in said body, said aperture having first, second and third portions disposed in that order from said head end toward said shank end, said first and third portions being cylindrical with said first portion smaller than said third portion, said second portion being conical at an included angle of about 14 degrees and smoothly joining to each of said first and third portions; an elongated metal probe rod disposed coaxially in said aperture; an insulator tube disposed between said probe rod and said body at said aperture; said probe rod having first, second and third portions, said first and third portions being cylindrical with said first portion smaller than said third portion, said second portion being conical at an included angle of about 14 degrees and smoothly joining to each of said first and third portions; said insulator tube being thin-walled and of substantially uniform wall thickness throughout the length thereof, said insulator tube covering said first, second and third portions of said probe rod within said body aperture and additional portions exterior to said head end of said body and interior of said shank end of said body to cover substantially the entire length of said probe rod, an exposed cylindrical periphery on the inner end of said probe rod, said insulator tube being heat-shrunk into tight engagement with said probe rod from a cylindrical tube of TFE polytetrafluoroethylene Teflon; a threaded outer end on said probe rod first portion; a stand-off tubular insulator on the head end of said body; and a nut threaded on said rod outer end to hold said insulator tube tightly squeezed between said probe rod and said body to maintain a liquid and pressure tight seal at said conical surfaces with a locking taper joint thereat; the diameter of said rod third portion being only slightly less than the diameter of said aperture first portion to thus establish said insulator tube under a shear stress and withstanding extrusion of said rod through said body under pressure and effecting said liquid and pressure tight seal.

References Cited
UNITED STATES PATENTS 1,205,571    11/1916    Sharpnack et al. _____ 219—292

FOREIGN PATENTS 1,230,548    4/1960    France.
59,705    1/1920    Sweden.

LOUIS R. PRINCE, *Primary Examiner.*

S. C. SWISHER, *Assistant Examiner.*